(12) United States Patent
Mattheis

(10) Patent No.: US 7,736,082 B1
(45) Date of Patent: Jun. 15, 2010

(54) FASTENING SYSTEM FOR ASSEMBLING PLASTIC UNITS AND RIB CLIP THEREFOR

(76) Inventor: Harley H. Mattheis, 9 Upland Way, Verona, NJ (US) 07044

( * ) Notice: Subject to any disclaimer, the term of this patent is extended or adjusted under 35 U.S.C. 154(b) by 654 days.

(21) Appl. No.: 11/525,455

(22) Filed: Sep. 21, 2006

(51) Int. Cl.
*B25G 3/18* (2006.01)
*F16B 21/00* (2006.01)
*F16D 1/00* (2006.01)

(52) U.S. Cl. .................. 403/329; 403/326; 403/397; 411/970

(58) Field of Classification Search .................. 403/319, 403/326, 329, 397; 411/172, 970; 248/223.31, 248/224.7, 224.8
See application file for complete search history.

(56) References Cited

U.S. PATENT DOCUMENTS

| | | | |
|---|---|---|---|
| 2,295,480 A | | 9/1942 | Johnson |
| 2,326,579 A | | 8/1943 | Tinnerman |
| 2,344,570 A | | 3/1944 | Tinnerman |
| 2,804,116 A | * | 8/1957 | Van Niel et al. ............ 411/247 |
| 3,310,929 A | * | 3/1967 | Garvey .................... 24/295 |
| 3,400,743 A | | 9/1968 | Strange |
| 3,673,643 A | * | 7/1972 | Kindell .................... 24/458 |
| 4,043,579 A | * | 8/1977 | Meyer ..................... 293/143 |
| 4,927,306 A | * | 5/1990 | Sato ....................... 411/182 |
| 5,536,125 A | | 7/1996 | Gaw, Jr. |
| 5,593,263 A | * | 1/1997 | Clinch et al. .............. 411/182 |
| 5,855,461 A | | 1/1999 | Tripi |
| 5,873,690 A | * | 2/1999 | Danby et al. .............. 411/55 |
| 6,283,689 B1 | * | 9/2001 | Roytberg et al. ........... 411/61 |
| 6,488,341 B2 | * | 12/2002 | Maruyama et al. ......... 301/5.21 |
| 6,796,760 B1 | | 9/2004 | Tanner |
| 6,811,345 B2 | | 11/2004 | Jackson |
| 6,848,874 B2 | | 2/2005 | Lowry et al. |
| 6,899,499 B2 | | 5/2005 | Dickinson et al. |
| 6,976,818 B2 | | 12/2005 | Levey et al. |
| 7,052,220 B1 | * | 5/2006 | Jutila et al. ................ 410/115 |
| 7,059,022 B2 | * | 6/2006 | Yuta et al. ................. 24/297 |

OTHER PUBLICATIONS

Spaniol et al. "Plastics: Ingenuity with Inserts." Appliance Design. Aug. 2006, 54:8, pp. 40-42.
Hoechst Celanese. Processing guide for Celon Acetal Copolyme. Publishing date unknown, pp. 19, 22-24.

* cited by examiner

*Primary Examiner*—Daniel P Stodola
*Assistant Examiner*—Nahid Amiri
(74) *Attorney, Agent, or Firm*—Siegmar Silber

(57) ABSTRACT

A fastener system for fastening the components of a plastic unit which has a U-shaped clip with an aperture therethrough, a walled cavity to receive the clip, and a machine screw. The walled cavity is molded onto the host portion of the plastic unit and has a low mass, which precludes the formation of sink marks and holes on the plastic unit. The U-shaped clip rests upon the walled cavity and has barbs that bite into the walls securing the clip in place. The machine screw is inserted into a housing on the joined portion of the plastic unit and is mated with a lead thread on the aperture of the clip. The metal-to-metal contact of the machine screw and clip permits repetitive assembly and disassembly of the plastic unit. The clip is readily removable for recycling the plastic of the unit.

6 Claims, 6 Drawing Sheets

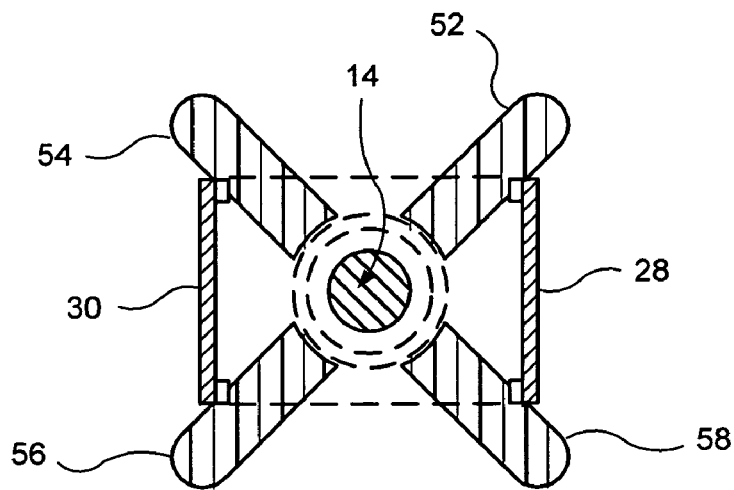
F I G. 3A
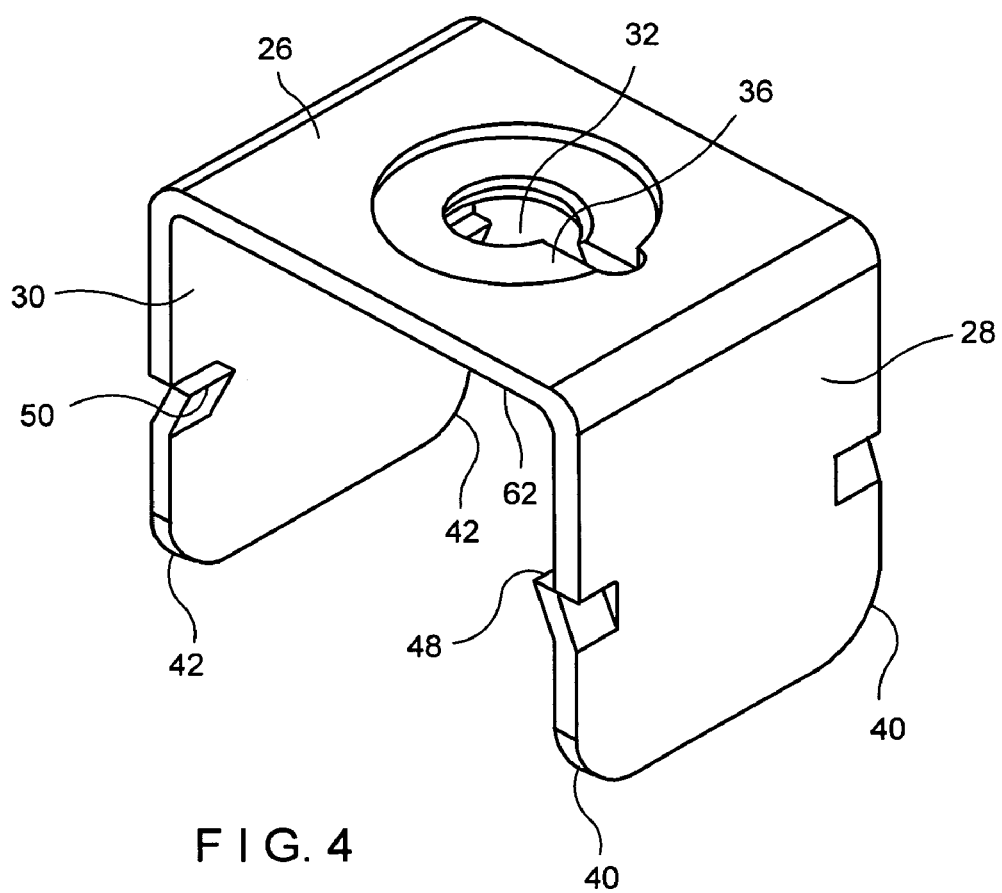
F I G. 4

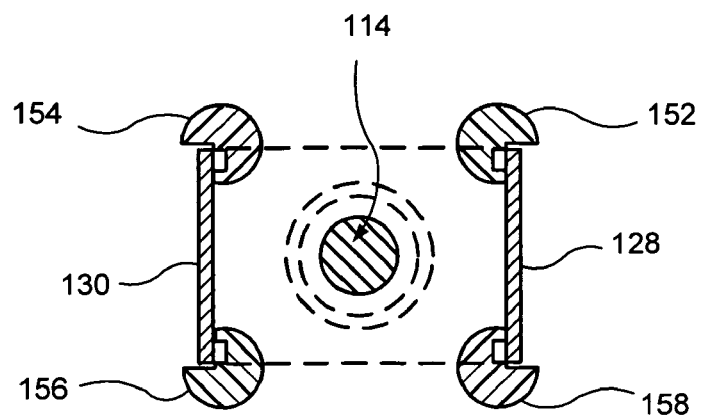
F I G. 6A
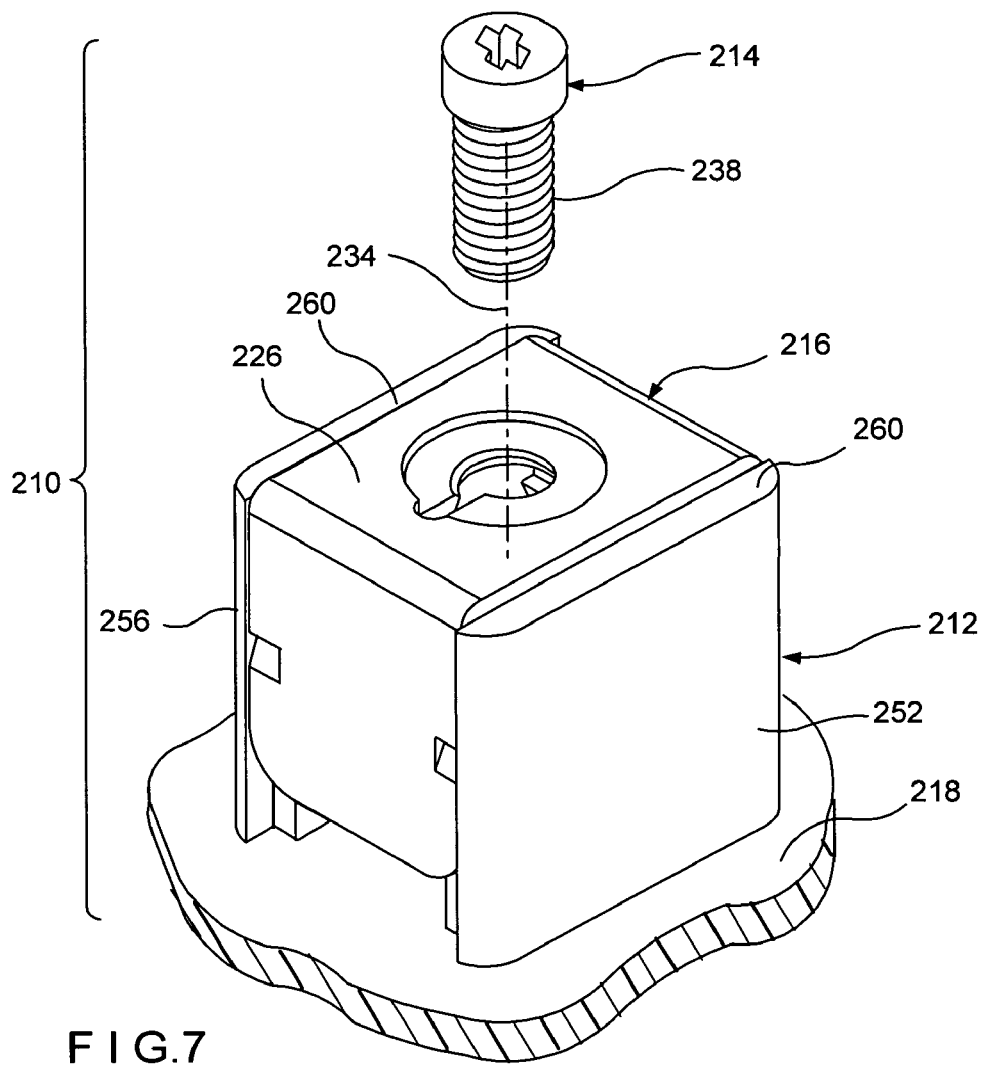
F I G. 7

FASTENING SYSTEM FOR ASSEMBLING PLASTIC UNITS AND RIB CLIP THEREFOR

BACKGROUND OF THE INVENTION

1. Field of the Invention

This invention relates to a fastening system for assembling plastic units and more particularly to spring steel clips for retaining attaching hardware in the assembly of molded plastic structures. The clips are utilizable with corresponding plastic receptors, such as ribs, which ribs, when employed in lieu of tubular plastic posts or bosses, avoid the occurrence of sink marks and sink holes opposite the attachment site. The clips of this invention also support repetitive assembly and disassembly.

2. Description of Prior Art

The connecting of large- or medium-scale molded plastic parts to one another has been fraught with technical problems for many years. In the 1940's, Tinnerman developed a fastener and a fastener company, Tinnerman Products, Inc., which aided assembly of such parts by the introduction of the Tinnerman nut. Tinnerman's success is memorialized by several patents including U.S. Pat. Nos. 2,326,579 and 2,344,570.

In many applications the boss-caused sink marks and sink holes are irrelevant as the sink holes do not interfere with the functionality or esthetics of the product and as the products are not routinely cleaned or sterilized. However, with products requiring highly esthetic finishes and fine cosmetic appearance, smooth surfaces without valleys or dimples are significant. Of course, in medical and personal hygiene products such surfaces are important as cleaning and sterilization are facilitated thereby.

In the design of modern-day plastic assemblies, attention is drawn to the overall recyclable aspects thereof. Where assemblies with molded-in-place brass inserts are used, recycling becomes difficult because of the salvage labor required to remove the inserts. Thus, in mis-manufactured plastic parts where an insert has been missed or insufficient resin is supplied to the mold or a color defect exists, regranulation becomes uneconomic. The use of metal inserts, while permitting repetitive assembly and disassembly, still remains problematic with regard to recycling and regranulation of waste plastic.

Another fastener arrangement, as shown in Levey et al, U.S. Pat. No. 6,976,818, assigned to Illinois Tool Works Inc., is the plastic boss and the corresponding screw. Here, without using an insert, an interlocking screw is driven into the plastic and cuts a swath in the plastic body of the boss. Various thread designs are known in the art and are configured for cutting and interlocking with the boss. Each time the plastic assembly is assembled and disassembled, additional cutting takes place. Unlike the metal insert discussed above, the plastic boss and screw fastener arrangement does not support repetitive assembly and disassembly.

The designing of bosses for mounting purposes is an inexact science that has given rise to numerous rules of thumb for avoiding sink marks and holes. Such rules provide: (1) the boss height should not be more than twice the diameter; (2) a radius should be provided where the boss joins the wall; and, (3) the boss diameter should be smaller in dimension than the thickness of the wall. While all the rules are helpful in enabling the mold designer to practice his art, the underlying problem is maintaining a suitable low mass of plastic for mounting purposes on one side of a plastic wall to avoid sink marks and holes on the other side.

As the automotive industry developed, many spring clips were designed to enhance assembly line operations. Among the earliest were those of Fred S. Carr and United-Carr Fastener Corporation which corporation worked closely with Fisher Body. Typical of the devices is the invention of F. E. Johnson, U.S. Pat. No. 2,295,480 providing a nut mounted on a clip for assisting panel mounting. A Ford Motor Company development provided a sliding clip of W. D. Gaw Jr, U.S. Pat. No. 5,536,125 to enable axial alignment. More recently, in a patent to L. P. Tanner, U.S. Pat. No. 6,796,760 a retention clip is disclosed. This U-shaped clip has a holding arm restraining lateral movement of a captive fastener during shipment of a panel (with fasteners held thereon).

In the course of preparing for this application, the inventor hereof became aware of the following patents:

| U.S. Pat. No. | Inventor | Issue Date |
|---|---|---|
| 6,976,818 | Levey et al. | Dec. 20, 2005 |
| 6,899,499 | Dickinson et al. | May 31, 2005 |
| 6,848,874 | Lowry et al. | Feb. 1, 2005 |
| 6,796,760 | Tanner | Sep. 28, 2004 |
| 6,283,689 | Roytberg et al. | Sep. 4, 2001 |
| 5,855,461 | Tripi | Jan. 5, 1999 |
| 5,536,125 | Gaw, Jr. | Jul. 16, 1996 |
| 3,400,743 | Strange | Sep. 10, 1968 |
| 2,344,570 | Tinnerman | Mar. 21, 1944 |
| 2,326,579 | Tinnerman | Aug. 10, 1943 |
| 2,295,480 | Johnson | Sep. 8, 1942 |

The patents not mentioned hereinabove are considered briefly below.

Dickinson et al—U.S. Pat. No. 6,899,499—issued May 31, 2005 Dickinson '499 discloses a fastener that snaps into a slot-containing structure attached to the host portion of the unit being attached. The structure required to snap the fastener into place necessarily has a high mass, running a high risk for sink marks and holes. The metal fastener thereof is not readily removable for the recycling of the plastic.

Lowry et al—U.S. Pat. No. 6,848,874—issued Feb. 1, 2005 Lowry '874 discloses a spring fastener with a configuration of barbs that allows for the extraction of the fastener without the destruction of the slot or the fastener. However, since the fastener must be installed in a slot, the construction that would be required to use such a fastener in the present application, without puncturing the host portion of the plastic unit, would necessarily have a high mass, thereby causing the formation of sink marks and holes on the opposite side of the wall.

Tanner—U.S. Pat. No. 6,796,760—issued Sep. 28, 2004 Tanner '760 discloses a retainer for a captive fastener during transportation thereof. It is suitable for application to automotive technology, particularly for panels with pre-inserted fasteners, which do not require repetitive insertion and removal.

Roytberg et al—U.S. Pat. No. 6,283,689—issued Sep. 4, 2001 Roytberg '689 discloses a one-piece insert fastener with outwardly protruding wings, which wings are secured within an aperture in the outer surface of a panel.

Tripi—U.S. Pat. No. 5,855,461—issued Jan. 5, 1999 Tripi '461 discloses an anchor for securing a threaded fastener, which provides for repetitive assembly and disassembly, and is suitable for application to automotive technology, particularly for panels. The anchor of this invention is for mounting in a circular hole.

Gaw, Jr.—U.S. Pat. No. 5,536,125—issued Jul. 16, 1996 Gaw Jr. '125 discloses a fastening assembly for securing plastic panels to metallic substrates. As part of the fastening assembly, a nut is snap-fit mounted to a plastic insert, which plastic insert in turn is snapped into the substrate. The fastening assembly is suitable for application to automotive assembly and provides for repetitive assembly and disassembly.

Strange—U.S. Pat. No. 3,400,743—issued Sep. 10, 1968 Strange '743 discloses a fastener that includes a screw and a sheetmetal nut holder with resilient arms. The retention force of the resilient arms results from the screw insertion and spreading of the arms thereby. Thus, upon the removal of the screw, the nut is freed.

Johnson—U.S. Pat. No. 2,295,480—issued Sep. 8, 1942 Johnson '480 discloses a nut device that requires a hole for installation of the nut. Thus, for use in the present application, where a puncture is to be avoided, the molding of a boss is required.

In viewing the prior art, several fastener system and fastener characteristics have been considered, namely: (1) the likelihood of the formation of sink marks and sink holes on the plastic unit being assembled; (2) the effect of repetitive disassembly and reassembly on the structure; and, (3) the ease of recapturing and regranulating plastic from mismanufactured units. None of the above configurations satisfy all of these desired criteria.

It will be seen that the rib clip of this invention both considered alone and together with the other components of the fastener system provide an answer to the long felt need expressed by the above criteria.

SUMMARY OF THE INVENTION

The fastener system described herein is specifically designed for aiding assembly of a plastic unit having at least two parts. For descriptive purposes, the portion of the plastic unit that has a receptor for a clip is the host portion and the portion of the plastic unit that has a machine screw housing is the joined portion. The receptor is a walled cavity molded on one side of the host portion and is characterized by a low mass (thereby avoiding sink marks and sink holes on the other side thereof).

The clip is a U-shaped body and inserts into the walled cavity of the host portion. Being constructed of spring steel, when in use, the clip is under slight spring tension and barbs extending from the edges dig into the plastic of the walled cavity firmly securing the clip as installed. The middle portion of the clip is flat and has a lead thread about a central aperture and is seated on the shaftway provided for the machine screw.

The machine screw housing of the joined portion, when the two parts are being joined aligns the machine screw to mate with the lead thread. As the header of the walled cavity is precision molded, upon the clip being fully seated, the lead thread also accurately positions the fastener in the shaftway. The legs or side portions of the clip are dimensioned to fit the channels of the receptor therefor, which channels are slightly deeper than required so that the header of the walled cavity determines the clip position rather than the channel bottom.

The metal-to-metal contact of the machine screw and clip ensures that the plastic unit can be repetitively assembled and disassembled without additional wear on the plastic parts. Also, unlike molded-in metal inserts, the clip hereof is readily removable prior to recycling.

OBJECTS AND FEATURES OF THE INVENTION

It is an object of the present invention to provide a fastening system for assembling plastic units which is economical to manufacture and is readily and simply installed.

It is another object of the present invention is to provide a fastening system that will accurately align plastic parts to be joined and will withstand repetitive assembly and disassembly.

It is a further object of the present invention to provide a fastening system that, unlike systems with metal thread inserts, is readily removable from the plastic unit thereby allowing for regrinding and regranulation of plastic waste.

It is a yet further object of the present invention to provide a fastening system that requires a low-mass support structure on one side of the host portion of the plastic unit being assembled and thereby precluding the formation of sink holes on the obverse portion thereof.

It is a yet further object of the invention to provide a fastening system which, as sink holes are precluded, facilitates cleaning and sterilization of the utilized surface.

It is a feature of the present invention that the fastening system includes a spring steel rib clip that is readily and fully insertable into a cavity on the host portion of the plastic unit.

It is another feature of the present invention that, upon installation of the rib clip in a fully seated position, the machine screw mating therewith is accurately aligned and thereby facilitates assembly of the plastic unit.

It is yet another feature of the present invention that the low mass structure of the clip receptor enhances the production rate of the plastic unit.

Other objects and features of the present invention will become apparent upon reviewing the drawing and reading together therewith the description which follows.

BRIEF DESCRIPTION OF THE DRAWINGS

In the following drawing, the same parts in the various views are afforded the same reference designators.

FIGS. 3 and 3A are cross are cross-sectional schematic views of the assembled fastening system of shown in FIG. 2, wherein FIG. 3 is taken along the longitudinal axis of the machine screw and FIG. 3A normal to the longitudinal axis of the machine screw;

FIG. 4 is a perspective of an uninstalled rib clip of FIG. 2;

FIGS. 6 and 6A are cross-sectional schematic views of the assembled fastening system shown in FIG. 5, wherein FIG. 6 is taken along the longitudinal axis of the machine screw and FIG. 6A normal to the longitudinal axis of the machine screw;

FIG. 7 is a perspective view of a third embodiment of a fastening system of this invention and shows the rib clip fully seated in the walled cavity formed by two bracket-shaped columns; and, FIGS. 8 and 8A are cross-sectional schematic views of the assembled fastening system shown in FIG. 7, wherein

DESCRIPTION OF THE PREFERRED EMBODIMENTS

Figure 1:
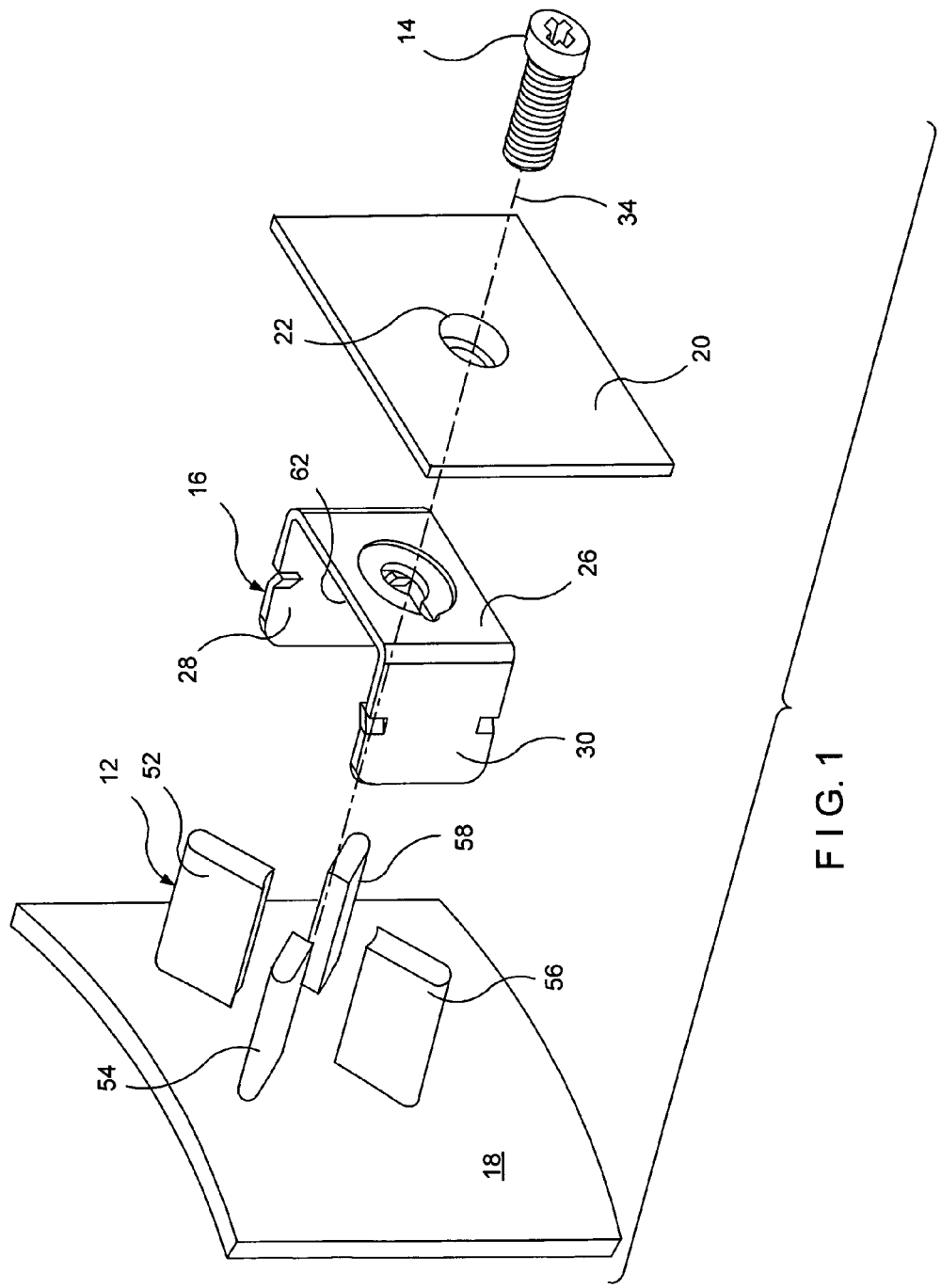
FIG. 1 is an exploded view of a first embodiment of a fastening system of this invention and shows a host portion and a joined portion of a plastic unit being joined together thereby.

This invention discloses a fastening system for attaching parts of a plastic unit together. In general terms, this is accomplished by attaching a clip for receiving a machine screw to a walled cavity. The walled cavity protrudes from one surface of the host portion of the plastic unit. The plastic unit also is constructed to include a portion-to-be-joined that has a machine screw housing. Upon jointure, with the screw in the machine screw housing and the clip snapped into the wall cavity, the screw is mated to the clip, and the two parts of the plastic unit are securely fastened. While not specifically delineated herein, the fastening system may be supplied with either a right-hand or a left-hand thread direction.

In the above description as well as in the description that follows, a walled cavity is a low-mass receptor molded into the host portion of the plastic unit. The low mass of the walled cavity precludes the formation of sink marks and sink holes on the obverse side of the wall of the host portion. As will be seen hereinbelow, the walled cavity may be variously constructed; however, in all the examples hereinbelow the elements of the walled cavity are arrayed about a shaftway for the machine screw. The walled cavities shown protrude from the surface of the host portion of the plastic unit and enable the clip to be fully seated. This ensures secure attachment and accurate alignment of the corresponding machine screw.

Referring now to FIGS. 1, 2, 3, 3A and 4, the first embodiment of the fastening system is shown and is generally referred to by the reference designator 10. The system has three primary components, namely: a walled cavity 12; a machine screw 14; and, a U-shaped clip or rib clip 16. The fastening system 10 fastens the components of a plastic unit, namely, a host portion 18 and a joined portion 20. The joined portion 20 has a machine screw housing 22. The walled cavity 12 protrudes from the host portion 18 and is arrayed about a screw shaftway 24.

The clip 16 is constructed of spring steel and is U-shaped, with a medial portion 26 and left and right side portions 28 and 30. The medial portion 26 has an aperture 32 at the center thereof. The clip has a longitudinal axis 34 passing through the center of the aperture 32 and substantially normal to the plane of the medial portion 26. The aperture 32 has a lead thread 36 dimensioned to engage the external thread 38 of the machine screw 14. The spring steel construction of the lead thread 36 facilitates the repetitive insertion and removal of the machine screw 14 without excessive wear and tear to the external thread 38 or the lead thread 36. Further, the repetitive assembly and disassembly does not disturb the securement of the clip 16 in the wall cavity 12. The left and right side portions 28 and 30 of the clip 16 are each dimensioned to be inserted into the wall cavity 12.

Figure 3:
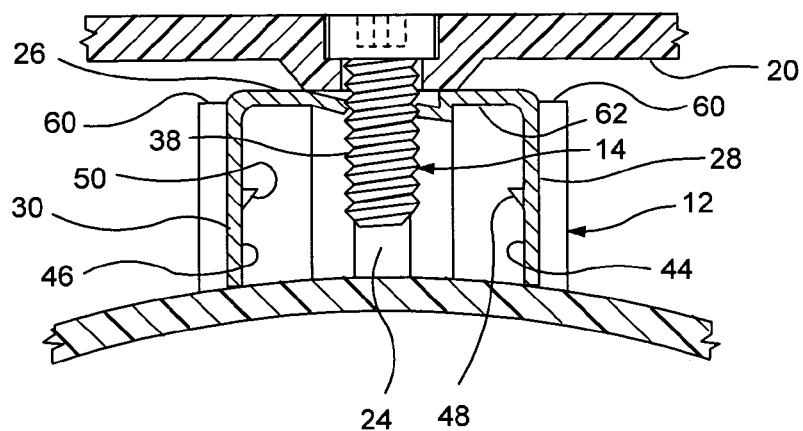

As best seen in FIG. 4, the side portions are shown with sufficient radii 40 and 42 to facilitate insertion into the clip channels 44 and 46 of the walled cavity 12. For purposes of securing the clip 16 to the walled cavity 12, the clip 16 is constructed with barbs or sharp projected portions 48 and 50, which, in the examples shown, are stamped out of the left and right side portions 28 and 30. Upon installation of the clip 16, these barbs 48 and 50 penetrate the surface of the walled cavity 12. Because of the spring characteristic of the clip 16, the barbs 48 and 50 hold the clip 16 to the host portion 18 with adequate strength to overcome any force and torque involved in assembly and disassembly of the plastic unit, as best seen in FIG. 3.

Figure 2:
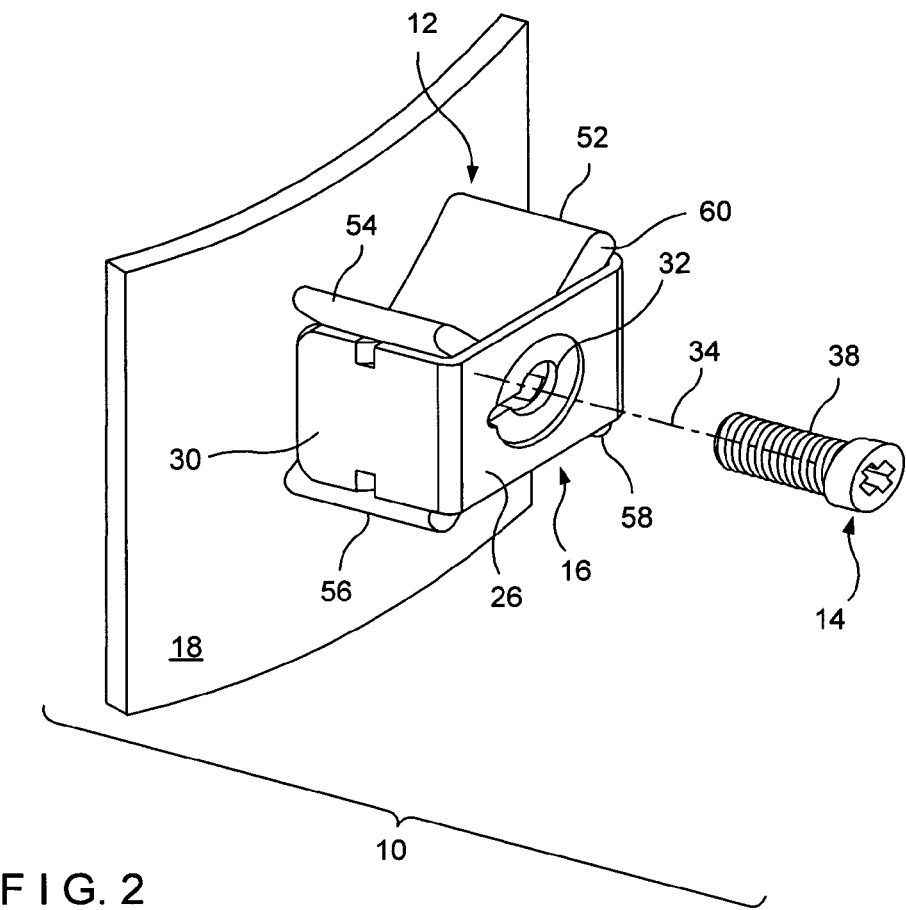
FIG. 2 is a perspective view of the host portion of FIG. 1 with the rib clip fully seated in the walled cavity formed by four ribs and the machine screw for insertion therein.

Referring again to FIGS. 1 and 2, the walled cavity 12 is shown, constructed from four freestanding ribs 52, 54, 56, and 58 arrayed about the screw shaftway 24. The clip channel 44 is disposed between ribs 52 and 54, and the clip channel 46 is disposed between ribs 56 and 58. In FIGS. 1 and 2, the ribs are shown disposed substantially equally spaced at 90-degree angles about the screw shaftway 24. However, the spacing and angles may vary, provided that, when installed, the clip 16 is fixed in place over the shaftway 24, and each barb penetrates the side of a rib.

In order for the aperture 32 of the clip 16 with the lead thread 36 thereof to be aligned with the screw shaftway 24, the clip 16 must be fully seated on the walled cavity 12. The ribs 52, 54, 56, and 58 form the walled cavity 12. The ribs 52, 54, 56 and 58 are attached to the host portion 18 at base 59 in an array about shaftway 24. At the ends of the ribs opposite base 59 is a header 60, which for alignment of machine screw 14, is precision formed or molded. Thus, upon the underside surface 62 of the medial portion 26 being in full contact with the surface of the header 60, the lead thread 36 is accurately aligned with respect to the screw shaftway 24.

By varying the design of the walled cavity 12, the clip 16 is utilizable with both planar and non-planar host portions. To accomplish this the seating of the clip 16 is controlled by the header 60 as the depths of the clip channels 44 and 46 of the walled cavity 12 extend beyond the reach of side portions 28 and 30. Also, the barbs 48 and 50, while shown being formed within the interior of the clip (that is between the side portions 28 and 30), may optionally be formed exterior to the side portions 28 and 30 of clip 16. In this way the barbs function cooperatively with various configurations of the walled cavity.

Because of the proximity of the medial section 26 of the clip 16 to the surface of the host portion 18, a low mass of plastic material is used in the rib structures 52, 54, 56, and 58. While the formation of sink marks and sink holes is not fully understood, the aforementioned low mass of plastic is known to preclude the formation of sink marks and holes. Furthermore, the low-mass structure has a shorter cooling cycle which, in the case of injection molding, enhances the production rate. When compared to the use of high-mass boss structures, the fastening system of this invention provides an economic advantage.

The description which follows is of a second embodiment of the fastening system of this invention. For ease of comprehension, where similar parts are used reference designators "100" units higher are employed. Thus, the machine screw 114 of the second embodiment is analogous to the machine screw 14 of the first embodiment.

Figure 5:
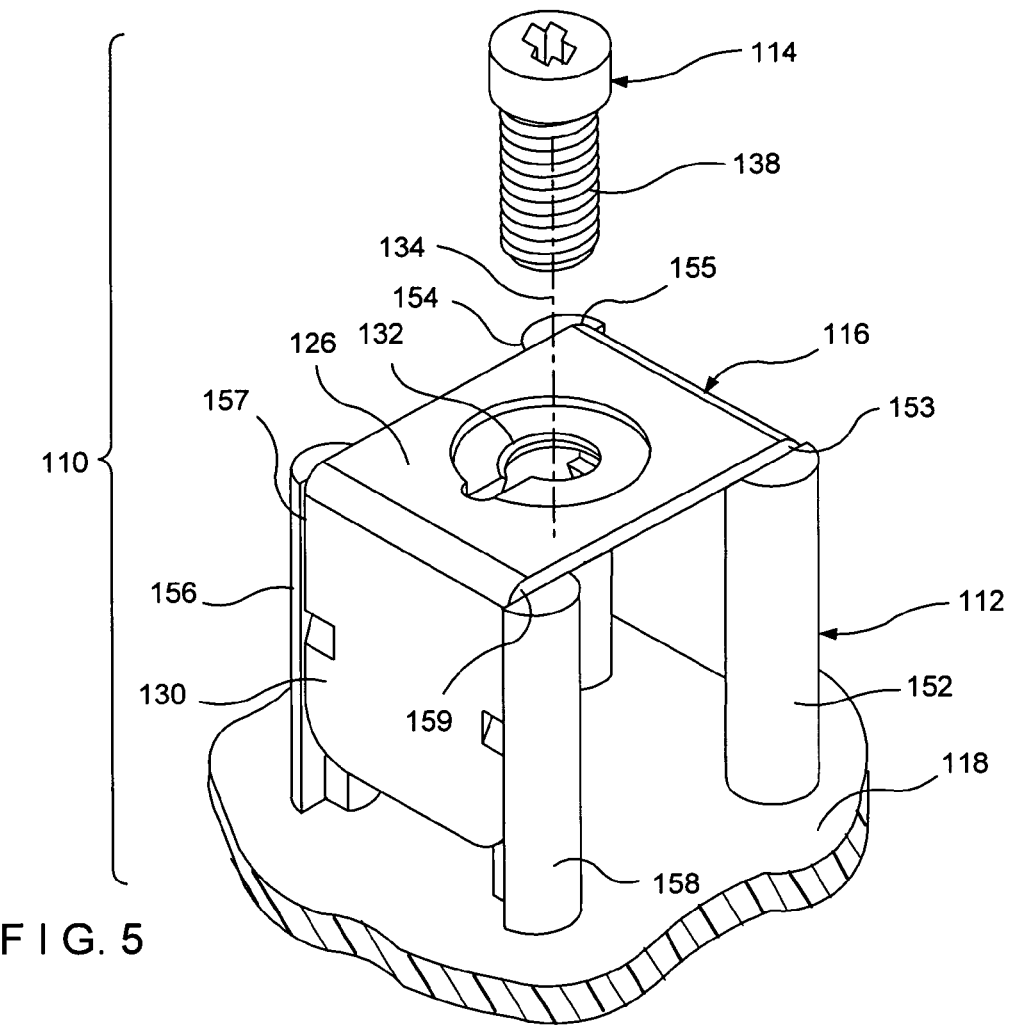
FIG. 5 is a perspective view of a second embodiment of a fastening system of this invention and shows the rib clip fully seated in the walled cavity formed by four V-shaped columns.
Figure 6:
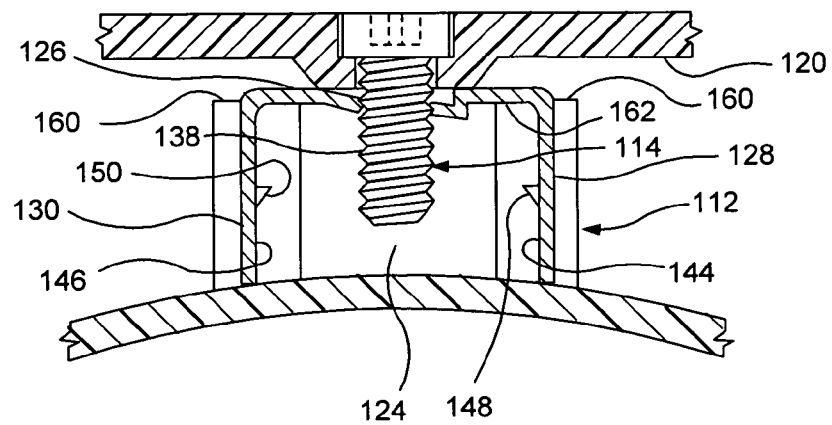

Referring now to FIGS. 5, 6 and 6A, the second embodiment of this invention is shown and is referred to generally by the reference designator 110. In the second embodiment of the fastening system, the walled cavity 112 is composed of four freestanding slotted columns 152, 154, 156, and 158 arrayed about the screw shaftway 124 to receive the edges 153, 155, 157, and 159 of the side portions 128 and 130 of the clip 116. The slotted columns may optionally be configured somewhat of variance with the above, but need to meet the following conditions: (1) the columns form a header 160 and the underside surface 162 of the medial portion 126 of the clip 116 is in full contact therewith; (2) the machine screw housing (not shown), the aperture of the clip 132, and the shaftway 124 are aligned along the longitudinal axis 134, which is normal to the header 160; (3) the barbs 48 and 50 sufficiently penetrate the columns 52, 54, 56, and 58, and, (4) the columns are constructed with a sufficiently low mass so as to preclude the formation of sink marks or holes.

The description which follows is of a third embodiment of the fastening system of this invention. For ease of comprehension, where similar parts are used reference designators "200" units higher are employed. Thus, the machine screw 214 of the third embodiment is analogous to the machine screw 114 of the second embodiment, which in turn corresponds to the machine screw 14 of the first embodiment.

Figure 8:
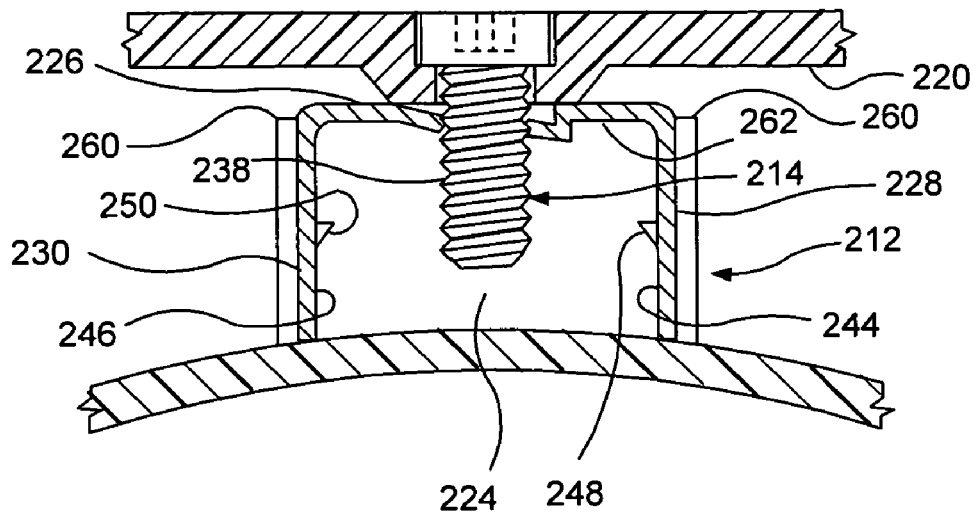
FIG. 8 is taken along the longitudinal axis of the machine screw and FIG. 8A normal to the longitudinal axis of the machine screw.
Figure 8A:
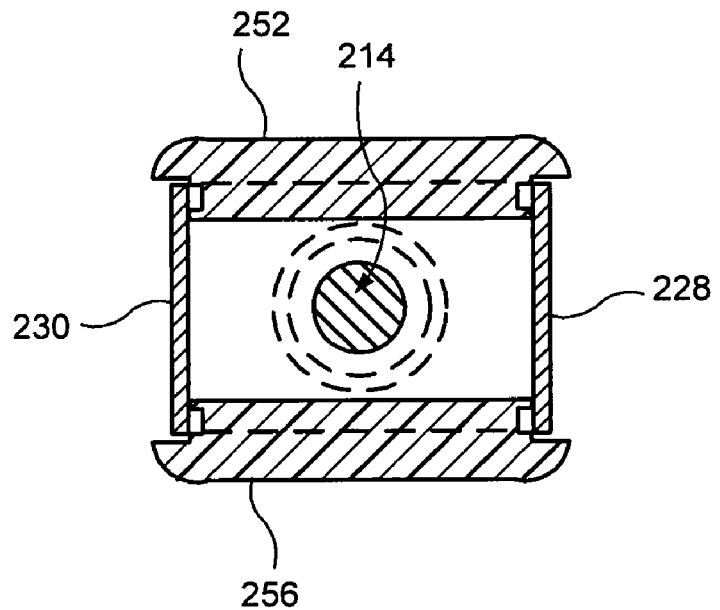

Referring now to FIGS. 7, 8 and 8A, the third embodiment of this invention is shown and is referred to generally by the reference designator 210. In the third embodiment of the fastening system, the walled cavity 212 is composed of two brackets or bracket-shaped freestanding columns 252 and 256 disposed substantially equally spaced from the screw shaftway 224. The distance between the two brackets 252 and 256 should be the length of the clip 216 measured from the external surface of right portion 228 to the external surface of left portion 230. Each bracket encompasses a clip channel. The right side portion 228 of the clip 216 slides into clip channel 244 of the right bracket 252, and the left side portion 230 of the clip 216 slides into clip channel 246 of the left bracket 256. The barbs 248 and 250 protrude from the outside of the clip 216, allowing them to penetrate the walls of the brackets 252 and 256, respectively. In this embodiment, as in the previous ones, a header 260 is formed, ensuring the securement of the clip 216 and the alignment of the aperture 232 with the screw shaftway 224 within the walled cavity 212 and the screw housing of the joined portion of the plastic unit (not shown).

In the above description, the preferred embodiments have been presented as a fastening system and variations thereof. As the novelty resides in the clip structure, in the following presentation of the claims, the fastening system with the novel clip is described. The description of the fastening system is followed thereafter by that of the fastener, which includes the novel clip, and then by that of the novel clip itself. All of these components are used to join parts of a plastic unit in a manner that can be repetitively assembled and disassembled. As the walled cavity is a construct having a low mass, the formation of sink marks and sink holes is precluded.

Other variations of the embodiments shown can be utilized without departing from the spirit of the claims which follow. For example, other variations of the walled cavity can be made to adapt the fastening system to particularly shaped plastic units.

What is claimed is:

1. A fastening system for aiding assembly of a plastic unit including a joined portion having a machine screw housing and a host portion having a screw shaftway extending thereform, said fastening system comprising:
   a walled cavity disposed on said host portion and arrayed about said screw shaftway, said walled cavity being a substantially low-mass body of plastic disposed on one surface of said host portion precluding formation of sink holes at the corresponding opposite surface of said host portion, in turn, comprising:
      a header portion aligning with said screw shaftway;
      four freestanding ribs disposed on said host portion and substantially equally spaced about said screw shaftway, said ribs fixedly receiving said U-shaped clip;
   a machine screw adapted for disposition in said machine screw housing of said joined portion, said machine screw having an external thread;
   a U-shaped clip for insertion into said walled cavity of said host portion, said U-shaped clip, in turn, comprising:
      a medial portion having an aperture therethrough being, upon installation, aligned with said screw shaftway;
      left and right side portions, each side portion contiguous with said medial portion at one end thereof and each dimensioned for insertion into said walled cavity of said host portion;
      a plurality of barbs in said right and left side portions, and, upon installation, said barbs bite into said walled cavity and secure said U-shaped clip to said host portion of said plastic unit; and,
      a lead thread about said aperture dimensioned to threadingly engage said external thread of said machine screw;
   said header portion dimensioned for fixedly receiving and for fully seating thereupon of said medial portion of said U-shaped clip and orienting said lead thread with said screw shaftway.

2. A fastening system as described in claim 1, wherein said U-shaped clip is spring steel and, upon installation in said walled cavity, is mounted under slight spring tension deforming said walled cavity by pressing said barbs thereinto.

3. A fastening system as described in claim 2, wherein said barbs are tabs bent out of said left and right side portions and, upon installation, are urged by said spring tension into said walled cavity.

4. A fastening system as described in claim 1, wherein said clip is metal permitting said machine screw to be repeatedly inserted and removed without excessive wear on said lead thread and without disturbing the securement of said clip in said walled cavity.

5. A fastening system as described in claim 1, wherein said left and right side portions of said clip each has a leading edge dimensioned to guide said side portions between said ribs facilitating the emplacement of said clip.

6. A fastener-receiving device as described in claim 1, wherein said aperture further comprises a lead thread dimensioned and adapted to threadingly engage the external threads of a machine screw.

* * * * *